United States Patent
Arita

(10) Patent No.: US 11,658,797 B2
(45) Date of Patent: May 23, 2023

(54) SYNCHRONIZATION TIMING DETECTOR, WIRELESS COMMUNICATION DEVICE, AND NON-TRANSITORY COMPUTER-READABLE RECORDING MEDIUM

(71) Applicant: JVCKENWOOD Corporation, Yokohama (JP)

(72) Inventor: Kaito Arita, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 0 days.

(21) Appl. No.: 17/463,585

(22) Filed: Sep. 1, 2021

(65) Prior Publication Data

US 2021/0399871 A1 Dec. 23, 2021

Related U.S. Application Data

(63) Continuation of application No. PCT/JP2019/048446, filed on Dec. 11, 2019.

(30) Foreign Application Priority Data

Mar. 18, 2019 (JP) .............................. JP2019-049897

(51) Int. Cl.
H04L 7/04 (2006.01)
H04L 27/14 (2006.01)

(52) U.S. Cl.
CPC .............. *H04L 7/04* (2013.01); *H04L 7/042* (2013.01); *H04L 27/14* (2013.01)

(58) Field of Classification Search
CPC . H04L 7/042; H04L 7/04; H04L 27/14; H04L 27/22; H04L 27/38; H04L 27/2656; H04L 27/2663

See application file for complete search history.

(56) References Cited

U.S. PATENT DOCUMENTS 5,140,617 A * 8/1992 Kubo ...................... H04L 7/042
                                                708/422
5,809,009 A * 9/1998 Matsuoka ............... H04L 7/042
                                                370/514

(Continued)

FOREIGN PATENT DOCUMENTS

JP          5283182          9/2013

OTHER PUBLICATIONS

International Search Report and Written Opinion for International Application No. PCT/JP2019/048446 dated Feb. 10, 2020, 8 pages.

*Primary Examiner* — Betsy Deppe
(74) *Attorney, Agent, or Firm* — Amin, Turocy & Watson, LLP

(57) ABSTRACT

A synchronization timing detector includes n correlators, a calculation unit, and a symbol timing estimating unit. The n correlators calculate and output correlation values, between a received signal oversampled m times for one symbol period and a known synchronization pattern, by shifting sample timings by m/n samples each, where m is a natural number, and n is a natural number that satisfies $3 \leq n \leq m$ and is a divisor of m. The calculation unit generates n correlation value vectors by arranging the correlation values output from the n correlators on polar coordinates at intervals of an angle of $2\pi(n/m)$ radians, and adds the n correlation value vectors to calculate an angle of a resultant vector of the correlation value vectors. The symbol timing estimating unit estimates a symbol timing of the received signal based on the angle of the resultant vector calculated by the calculation unit.

3 Claims, 6 Drawing Sheets

(56) References Cited

U.S. PATENT DOCUMENTS 6,683,493 B1 * 1/2004 Fujimora ................. H04L 7/04
329/307
8,270,510 B2 * 9/2012 Oh ...................... H04L 27/2656
375/260

* cited by examiner

SYNCHRONIZATION TIMING DETECTOR, WIRELESS COMMUNICATION DEVICE, AND NON-TRANSITORY COMPUTER-READABLE RECORDING MEDIUM

CROSS-REFERENCE TO RELATED APPLICATION

This application is a Continuation of PCT International Application No. PCT/JP2019/048446 filed on Dec. 11, 2019 which claims the benefit of priority from Japanese Patent Application No. 2019-049897 filed on Mar. 18, 2019, the entire contents of which are incorporated herein by reference.

BACKGROUND OF THE INVENTION

1. Field of the Invention

The present disclosure relates to a synchronization timing detector, a wireless communication device, and a non-transitory computer-readable recording medium.

2. Description of the Related Art

In digital wireless communications, the transmitter side transmits data on a frame-by-frame basis in which a synchronization word having a certain signal sequence pattern is arranged. The receiver side detects the synchronization word, thereby carrying out symbol synchronization to demodulate received data.

For example, Japanese Patent No. 5,283,182 discloses a technique that, even when received power substantially fluctuates, enables synchronization with symbols in a received signal.

However, conventionally, when detecting symbol synchronization, a correlation value with a synchronization word is calculated for each sample at a sampling rate that is more than ten times (for example, 16 times) as high as a symbol rate. As a result, the amount of information processing increases, and the processing load for detecting symbol synchronization increases.

SUMMARY OF THE INVENTION

A synchronization timing detector according the present disclosure includes n correlators, a calculation unit, and a symbol timing estimating unit. The n correlators are configured to calculate and output correlation values, between a received signal oversampled m times for one symbol period and a known synchronization pattern, by shifting sample timings by m/n samples each, where m is a natural number, and n is a natural number that satisfies 3≤n≤m and is a divisor of m. The calculation unit is configured to generate n correlation value vectors by arranging the correlation values output from the n correlators on polar coordinates at intervals of an angle of 2π(n/m) radians, and add the n correlation value vectors to calculate an angle of a resultant vector of the correlation value vectors. The symbol timing estimating unit is configured to estimate a symbol timing of the received signal based on the angle of the resultant vector calculated by the calculation unit.

A wireless communication device according to the present disclosure includes a detection unit configured to detect a radio frequency signal and convert the radio frequency signal into a received signal; a demodulation unit configured to demodulate the received signal; and a synchronization timing detector configured to generate a synchronization signal used by the demodulation unit for demodulating the received signal. The synchronization timing detector includes n correlators, a calculation unit, a symbol timing estimating unit, and synchronization signal generating unit. The n correlators are configured to calculate and output correlation values, between the received signal oversampled m times for one symbol period and a known synchronization pattern, by shifting sample timings by m/n samples each, where m is a natural number, and n is a natural number that satisfies 3≤n≤m and is a divisor of m. The calculation unit is configured to generate n correlation value vectors by arranging the correlation values output from the n correlators on polar coordinates at intervals of an angle of 2π(n/m) radians, and add the n correlation value vectors to calculate an angle of a resultant vector of the correlation value vectors. The symbol timing estimating unit is configured to estimate a symbol timing of the received signal based on the angle of the resultant vector calculated by the calculation unit. The synchronization signal generating unit is configured to generate the synchronization signal based on the estimated symbol timing.

A non-transitory computer-readable recording medium according to the present disclosure contains a computer program. The computer program causes a computer to execute calculating and outputting n correlation values, between a received signal oversampled m times for one symbol period and a known synchronization pattern, by shifting sample timings by m/n samples each, where m is a natural number, and n is a natural number that satisfies 3≤n≤m and is a divisor of m; generating n correlation value vectors by arranging the n correlation values on polar coordinates at intervals of an angle of 2π(n/m) radians, and adding the n correlation value vectors to calculate an angle of a resultant vector of the n correlation value vectors; and estimating a symbol timing of the received signal based on the angle of the resultant vector.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according to the present disclosure will be described in detail with reference to the accompanying drawings. The present disclosure is not limited by this embodiment and, when there are a plurality of embodiments, includes combinations of at least some of such embodiments.

EMBODIMENT

Figure 1:
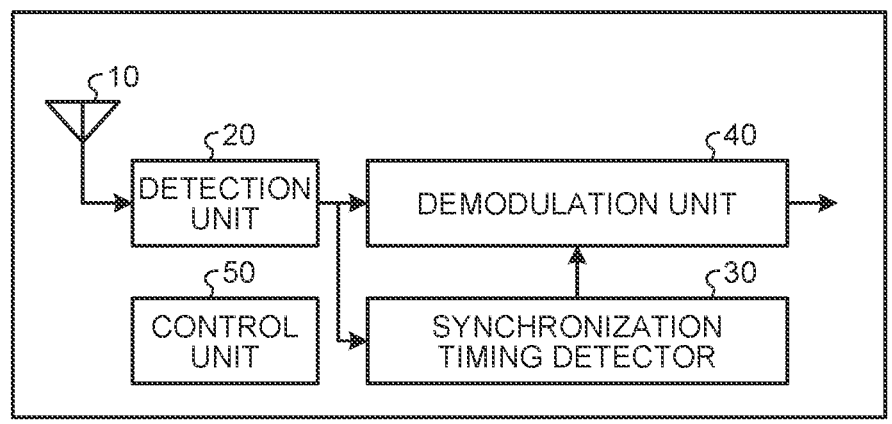
FIG. 1 is a block diagram illustrating an example of the configuration of a wireless communication device according to an embodiment of the present disclosure.

The configuration of a wireless communication device 1 according to the embodiment of the present disclosure will be described with reference to FIG. 1. FIG. 1 is a block diagram illustrating an example of the configuration of the wireless communication device 1.

The wireless communication device 1 includes an antenna 10, a detection unit 20, a synchronization timing detector 30, a demodulation unit 40, and a control unit 50. In the present embodiment, the wireless communication device 1 is a digital wireless communication device.

The antenna 10 receives a radio frequency (RF) signal transmitted from a wireless communication device different from the wireless communication device 1. The antenna 10 receives, for example, an RF signal modulated by a 4-value frequency shift keying (FSK). The antenna 10 outputs the received RF signal to the detection unit 20.

The detection unit 20 detects the RF signal. Specifically, the detection unit 20 includes, for example, an RF circuit unit, an orthogonal detection unit, an analog-to-digital (A/D) conversion unit, and a received-data converting unit, which are not illustrated. The RF circuit unit executes processing for changing the frequency of the RF signal received from the antenna 10. The RF circuit unit, for example, changes the signal into an intermediate frequency and outputs the resultant signal to the orthogonal detection unit. The orthogonal detection unit executes orthogonal detection on the signal received from the RF circuit unit and outputs the detected orthogonal signals to the A/D conversion unit. The A/D conversion unit executes analog-to-digital conversion on two orthogonal signals I and Q obtained by orthogonal detection by the orthogonal detection unit, thereby converting these signals into digital signals, and outputs the resultant signals to the received-data converting unit. The received-data converting unit converts orthogonal signals into a received signal. With respect to any signal that has been modulated by the aforementioned 4-value FSK, the received-data converting unit executes frequency modulation (FM) detection by arctangent detection on the signal to convert the signal into a received signal. The received signal output from the received-data converting unit is output to the synchronization timing detector 30 and the demodulation unit 40.

The A/D conversion unit oversamples a signal, for example, more than ten times (for example, 16 times) as high as a symbol rate. Therefore, a received signal output from the received-data converting unit is a signal oversampled with respect to the symbol rate. Thus, the detection unit 20 receives an RF signal and outputs a received signal that have been oversampled with respect to a symbol rate.

The synchronization timing detector 30 detects the timing of symbol synchronization. The synchronization timing detector 30 outputs timing information (a symbol synchronization signal) regarding the timing for starting the symbol synchronization. The synchronization timing detector 30 also detects the timing for frame synchronization. The synchronization timing detector 30 outputs timing information (a frame synchronization signal) regarding the timing for starting the frame synchronization. The configuration of and processing to be performed by the synchronization timing detector 30 will be described later.

The demodulation unit 40 executes demodulation processing on the received signal based on the timing information detected by the synchronization timing detector 30.

The control unit 50 controls the units included in the wireless communication device 1. That is, the control unit 50 controls the detection unit 20, the synchronization timing detector 30, and the demodulation unit 40. The control unit 50 is composed of, for example, a central processing unit (CPU), a random access memory (RAM), a read only memory (ROM), and the like. In this case, the ROM stores therein computer programs that the CPU uses to control the units. The CPU controls the units in the wireless communication device 1 by reading out the computer programs stored in the ROM and allocating data areas in the RAM to execute the computer programs. In other words, the control unit 50 implements functions of the wireless communication device 1 according to the present embodiment by executing the computer programs recorded in a non-transitory computer-readable recording medium.

Synchronization Timing Detector

Figure 2:
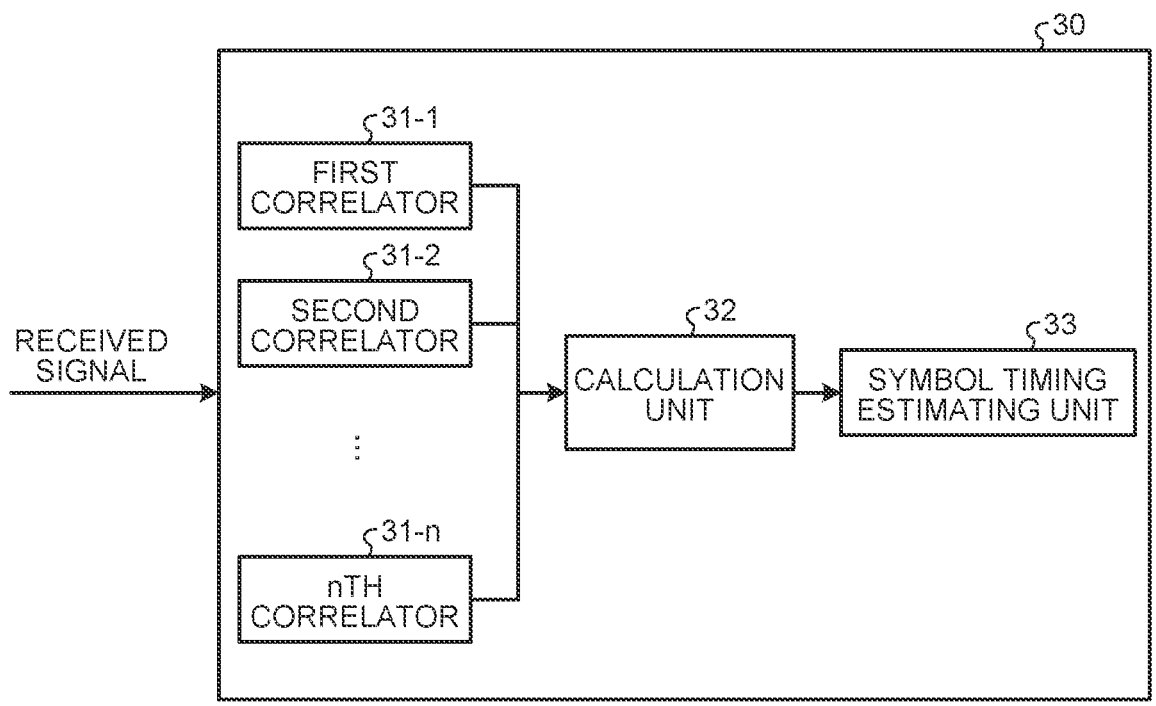
FIG. 2 is a block diagram illustrating an example of the configuration of a synchronization timing detector according to the embodiment of the present disclosure.

The synchronization timing detector according to the embodiment of the present disclosure will be described with reference to FIG. 2. FIG. 2 is a block diagram illustrating an example of the basic configuration of the synchronization timing detector according to the embodiment of the present disclosure.

The synchronization timing detector 30 includes a first correlator 31-1, a second correlator 31-2, . . . , an nth (n is a natural number of 3 or larger) correlator 31-$n$, a calculation unit 32, and a symbol timing estimating unit 33.

Each of the first correlator 31-1 to the nth correlator 31-$n$ receives a received signal oversampled m times. The first correlator 31-1 to the nth correlator 31-$n$ calculate correlation values R between signal samples sampled at certain different sample timings and a known synchronization pattern. The certain sample timings are shifted by m/n samples each. Here, n is a natural number that satisfies $3 \leq n \leq m$ and is a divisor of m. For example, when m is 16 and n is 4, the sample timings for correlation values Rn are shifted by 4 samples each. The correlators 31-1 to 31-4 calculate correlation values R1 to R4, respectively starting from the first, fifth, ninth, and thirteenth samples of 16 samples (first to 16th samples) in one symbol period. That is, the first correlator 31-1 calculates the correlation value R1 in one symbol period from the first sample to the next first sample. The second correlator 31-2 calculates a correlation value R2 in one symbol period from the fifth sample to the next fifth sample. The third correlator 31-3 calculates a correlation value R3 in one symbol period from the ninth sample to the next ninth sample. The fourth correlator 31-4 calculates a correlation value R4 in one symbol period from the thirteenth sample to the next thirteenth sample. Thus, the four correlators 31-$n$ calculate the correlation values Rn with respect to the signal samples of the received signal, by shifting sample timings by 4 samples each. Each of the correlators calculates the corresponding correlation value based on Expression (1) given below.

$$\text{Correlation value} = \sum_{k=1}^{l} S[k] * B[k] \quad (1)$$

In Expression (1), S[k] is data of a synchronization word, and B[k] is received data that has been buffered. In addition, l (lower-case L) is the data length of the synchronization word.

Figure 3:
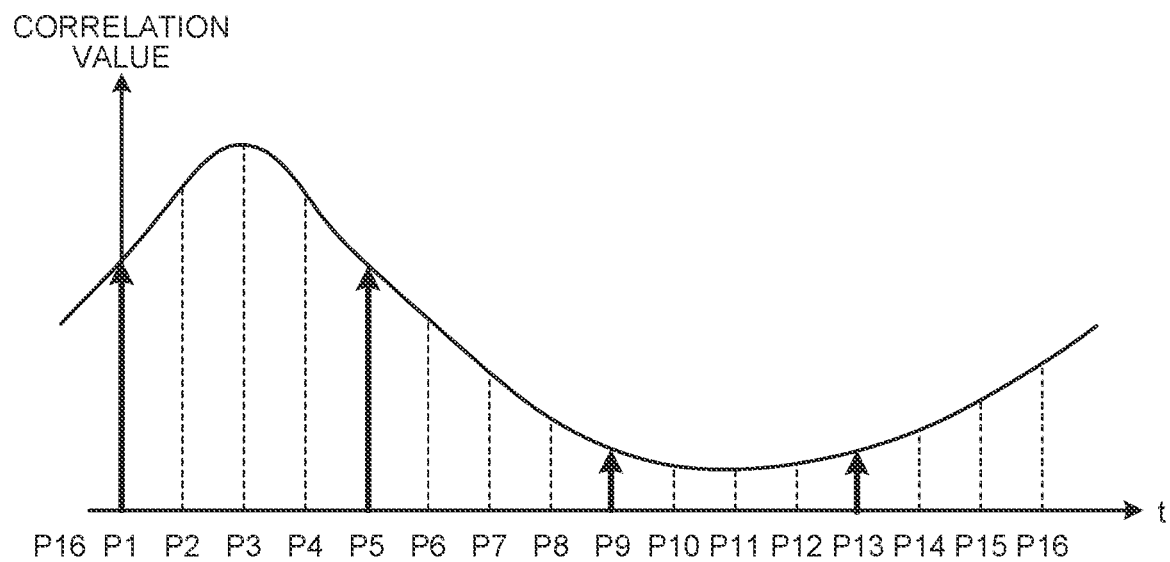
FIG. 3 is a schematic diagram illustrating correlation values of samples in one period in the present embodiment.

FIG. 3 illustrates a state in which the correlation values Rn output from the n correlators, which are the first correlator 31-1 to nth correlator **31-*n*, are plotted for sample timings P1 to Pm. For example, the output of the first correlator 31-1 is illustrated with the magnitude of the corresponding correlation value indicated as an upward arrow at the position of P1. The same applies to each of the second correlator 31-2** to fourth correlator.

Figure 4:
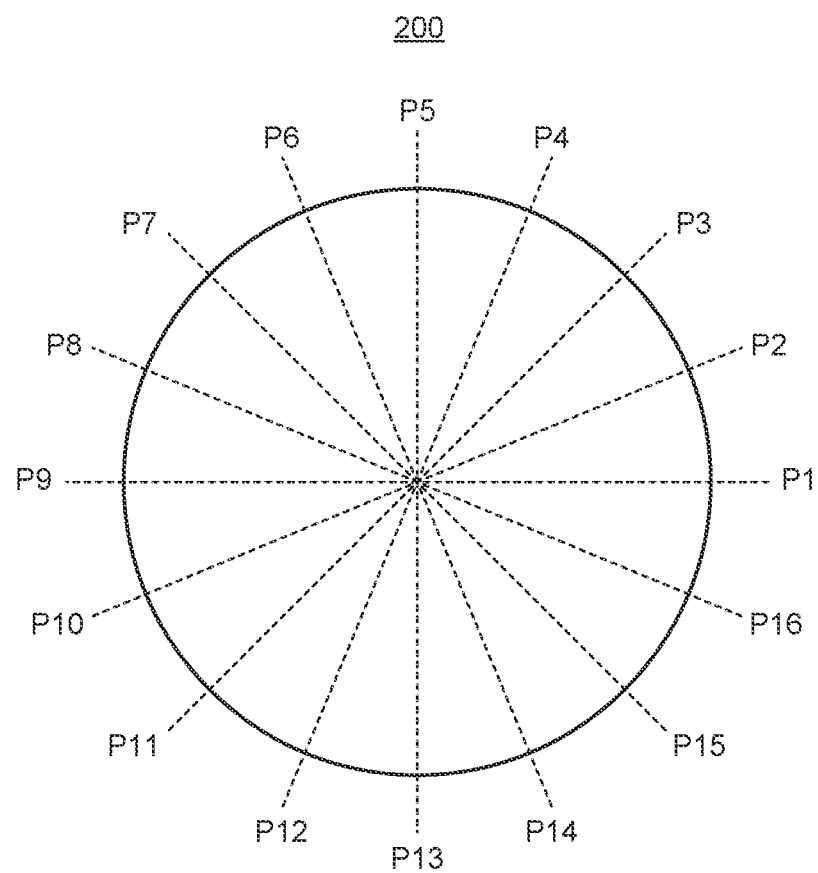
FIG. 4 is a schematic diagram for explaining an example of a method of arranging the correlation values on polar coordinates.
Figure 5:
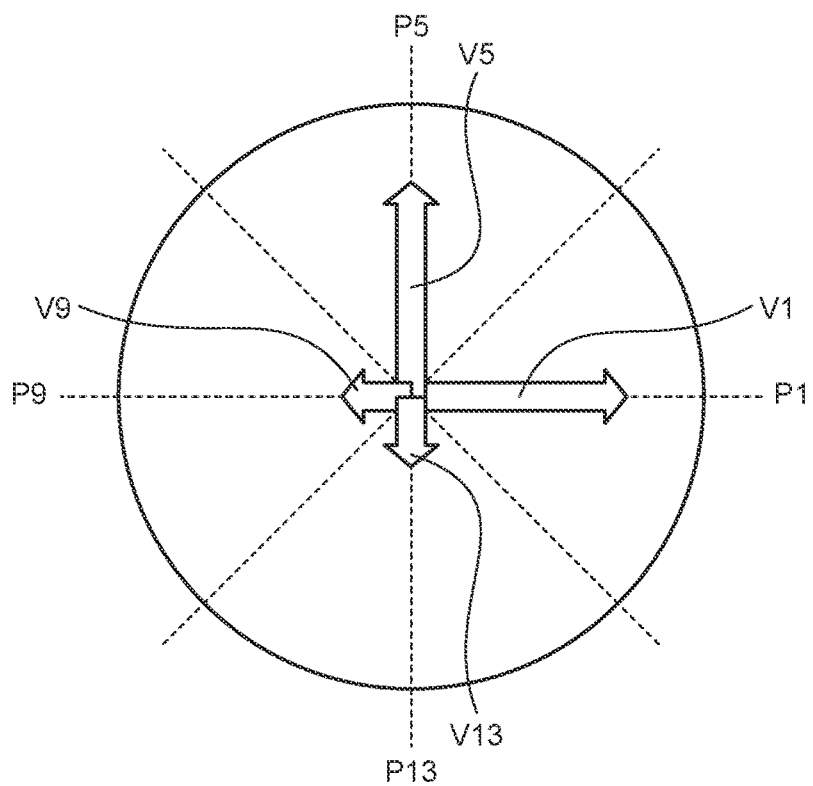
FIG. 5 is a schematic diagram for explaining an example of a method of calculating the correlation values in the form of correlation value vectors.

The calculation unit 32 repeats calculating the correlation values Rn until any one of the correlation values Rn exceeds a predetermined threshold. When any one of the correlation values Rn exceeds the predetermined threshold, the calculation unit 32 arranges the correlation values Rn illustrated in FIG. 3 on polar coordinates illustrated in FIG. 4. As a result, the correlation values Rn are expressed on the polar coordinates as n correlation value vectors V1, V5, V9, and V13 whose magnitudes are the absolute values of the corresponding correlation values and which are arranged at intervals of an angle of 2π(n/m) radians, as illustrated in FIG. 5. The calculation unit 32 performs addition of the correlation value vectors V1, V5, V9, and V13. The calculation unit 32 calculates the angle of the resultant vector of the correlation value vectors on the polar coordinates. For the sake of simplifying description, the angle corresponding to the sample timing P1 is set to 0 radians.

Figure 6:
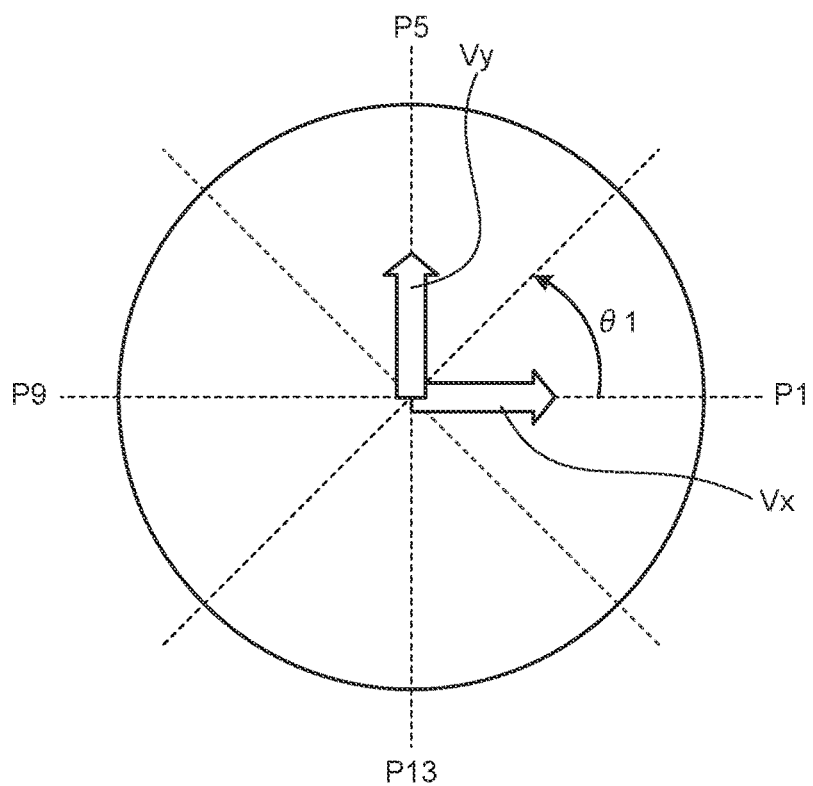
FIG. 6 is a schematic diagram for explaining x components and y components of the correlation values.

The angle of the resultant vector of the correlation value vectors may be calculated in such a manner that: the x component and the y component of each of the correlation value vectors are calculated; the difference among the x components and the difference among the y components are calculated; and an arctangent is calculated based on the calculated x component and y component. For example, the calculation unit 32 calculates the difference among the x components and the difference among the y components of the correlation value vectors V1, V5, V9, and V12 that are arranged at intervals of 90 degrees, where the number n of correlators is 4. The calculation unit 32 calculates the x component and the y component of each of the correlation value vectors using Expression (2) below for the x component and using Expression (3) below for the y component, and then calculates the difference (Vx) among the x components and the difference (Vy) among the y components as illustrated in FIG. 6.

$$x \text{ component} = \sum^{n} \text{Correlation value for nth buffer} * \text{Cos(Angle for nth buffer)} \quad (2)$$

$$y \text{ component} = \sum^{n} \text{Correlation value for nth buffer} * \text{Sin(Angle for nth buffer)} \quad (3)$$

The calculation unit 32 calculates an arctangent from the difference Vx and the difference Vy according to Expression (4) in order to obtain an angle of the resultant vector of the correlation value vectors on the polar coordinates.

$$\text{Angle} = \arctan\left(\frac{y \text{ component of correlation value}}{x \text{ component of correlation value}}\right) \quad (4)$$

The reason for the calculation unit 32 to perform addition of vectors and obtain the angle is to estimate the sample timing at which a correlation value becomes maximum. As illustrated in FIG. 3, the synchronization timing detector 30 according to the embodiment of the present disclosure does not calculates the correlation values corresponding to all the sample timings P1 to P16 in one symbol period, but calculates the correlation values corresponding to only the sample timings P1, P5, P9, P13 that are thinned out at the certain intervals. Therefore, it is needed to estimate the magnitude of the correlation value and the sample timing when the correlation value is maximized.

The calculation unit 32 arranges, on the polar coordinates, the correlation values corresponding to the sample timings that are thinned out to obtain the correlation value vectors. Angles on the polar coordinates can express 16 samples in one round, and angles formed by the correlation value vectors indicate the sample timings that are the starting points for calculating the correlation values. Therefore, the resultant vector of the correlation value vectors calculated by the calculation unit 32 indicates a correlation value vector when the correlation value is maximized. Thus, an angle (prediction angle θ1) formed by the resultant vector of the correlation value vectors calculated by the calculation unit 32 can be estimated to be a sample timing at which a correlation value becomes maximum.

Based on the prediction angle θ1, the symbol timing estimating unit 33 estimates a symbol timing at which a timing of a symbol included in the received signal and a timing of detecting the symbol of the received signal at the receiver side are synchronized. As illustrated in FIG. 4, one round on the polar coordinates indicates one symbol period. The symbol timing estimating unit 33 estimates that the correlation value becomes maximum at the prediction angle θ1. The symbol timing estimating unit 33 further estimates a sample timing that corresponds to the angle at which the correlation value becomes maximum because one round on the polar coordinates indicates one symbol period, as illustrated in FIG. 4. The symbol timing estimating unit 33 further estimates the symbol timing from the sample timing at which the correlation value becomes maximum. Thus, when a received signal is sampled from the sample timing that correspond to the prediction angle θ1, it can be said that the correlation value with the synchronization word becomes maximum. Because the correlation value with the synchronization word is maximized, it can be said that estimation of the timing of the synchronization word has been enabled. In addition, because the position (symbol timing) of a symbol in the waveform of the synchronization word is known, the sample timing at which the correlation value with the synchronization word becomes maximum can be estimated, thereby enabling estimation of the timing of the synchronization word itself and further enabling estimation of the symbol timing at which a timing of a symbol included in the received signal and a timing of detecting the symbol of the received signal at the receiver side are synchronized.

Synchronization Timing Detecting Method

Figure 7:
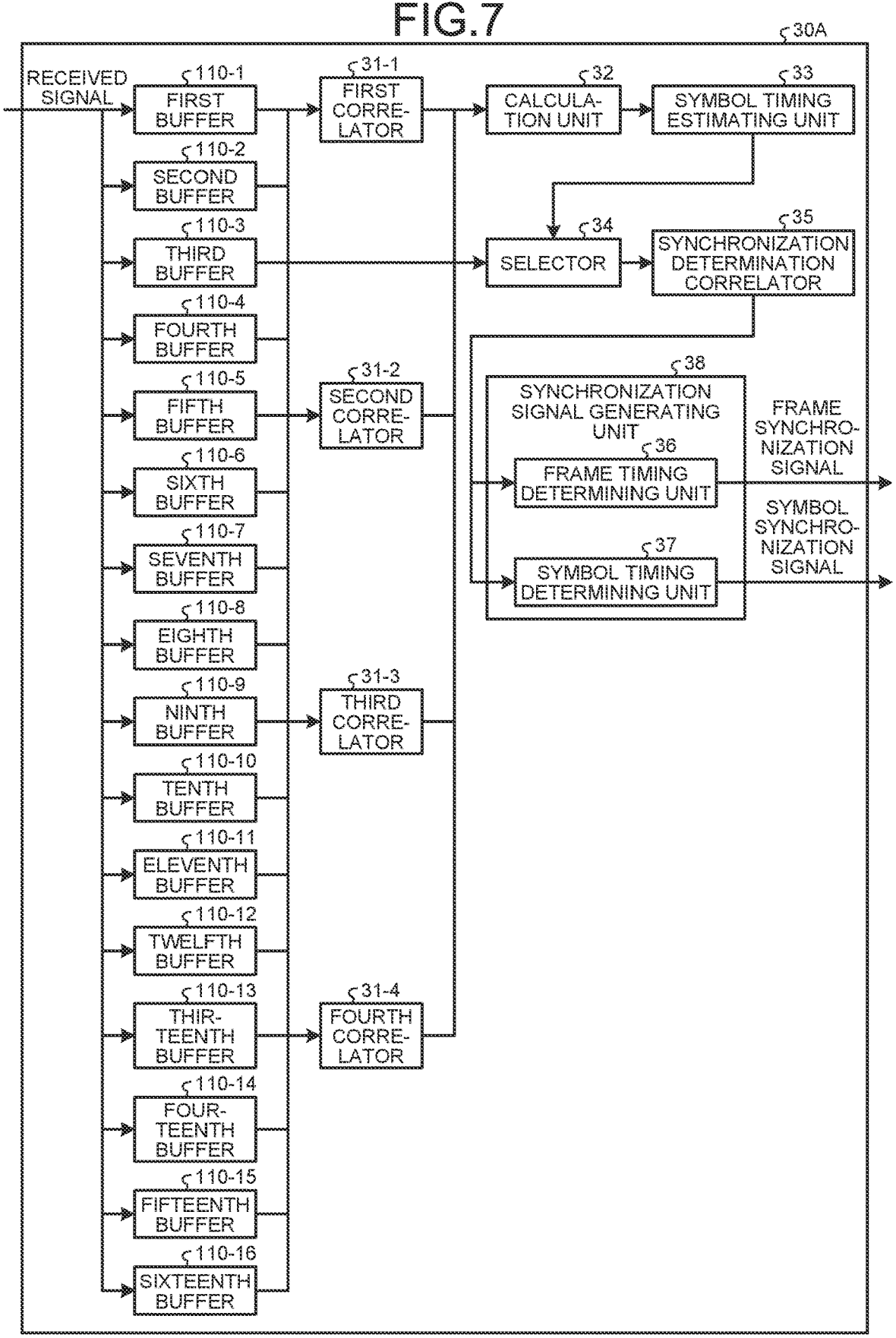
FIG. 7 is a functional block diagram illustrating in detail the synchronization timing detector according to the embodiment of the present disclosure.
Figure 8:
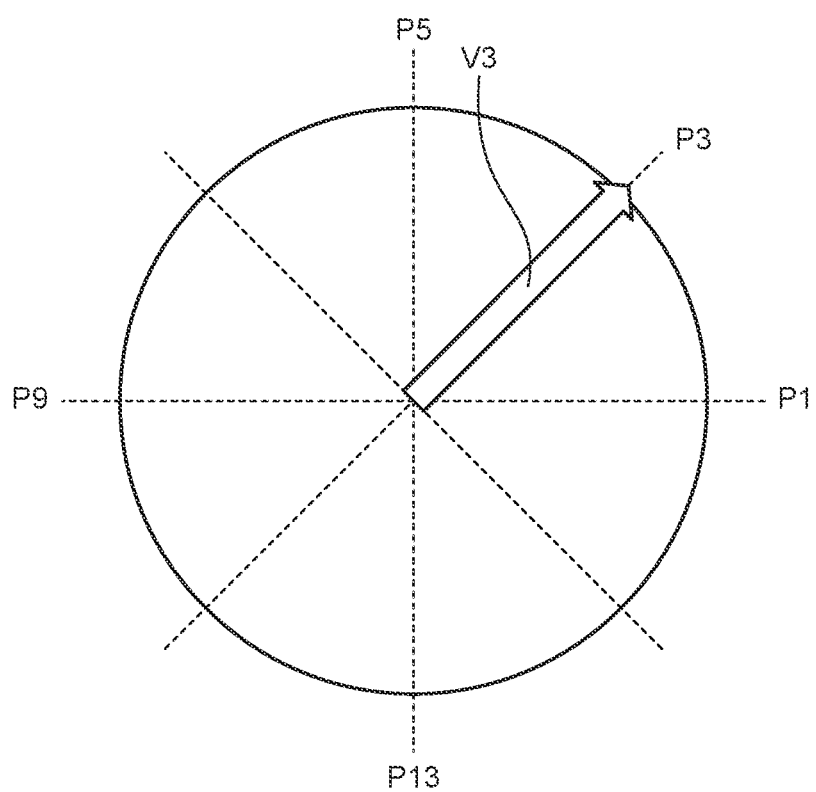
FIG. 8 is a schematic diagram illustrating a correlation value vector corresponding to a prediction angle.

A synchronization timing detecting method in a wireless communication device that includes a synchronization timing detector according to the present embodiment will be described with reference to FIG. 7. FIG. 7 is a functional block diagram illustrating in detail a synchronization timing detector according to the present embodiment.

In a synchronization timing detector 30A according to the present embodiment, a sampling rate at the receiver side is set to m times as high as a sampling rate at the transmitter side, that is, for example, 16-time oversampling is performed. In this case, the synchronization timing detector 30A includes 16 buffers. In the following description, a case where oversampling in which a sampling rate at the receiver side is set to 16 times as high as that at the transmitter side will be described. However, this is merely an example and is not intended to limit the present disclosure. For example, setting a sampling rate at the receiver side may be set to more than ten times as high as a sampling rate at the transmitter side.

The synchronization timing detector 30A according to the present embodiment includes a first buffer 110-1 to a 16th buffer 110-16, the first correlator 31-1 to the fourth correlator 31-4, the calculation unit 32, the symbol timing estimating unit 33, a selector 34, a synchronization determination correlator 35, a frame timing determining unit 36, and a symbol timing determining unit 37.

The 16 buffers each store therein a received signal by shifting storage timings by one sample each. In the same manner as performed with the basic configuration described using FIG. 2, the n correlators determine correlations between a synchronization word and individual signal samples of a received signals output from the buffers corresponding to the sample timings shifted by m/n samples. Here, n is a natural number that satisfies $3 \leq n \leq m$ and is a divisor of m. Because the number of correlators is 4, n equals 4. This means that the n correlators calculate correlation values between the synchronization word and individual pieces of output from the buffers corresponding to the sample timings shifted by 4 samples. The first correlator 31-1 calculates a correlation value with respect to the output from the first buffer 110-1; the second correlator 31-2 calculates a correlation value with respect to the output from the fifth buffer 110-5; the third correlator 31-3 calculates a correlation value with respect to the output from the ninth buffer 110-9; and the fourth correlator 31-4 calculates a correlation value with respect to the output from the thirteenth buffer 110-13. The calculation unit 32 calculates the prediction angle $\theta 1$ in the same manner as with the basic configuration illustrated in FIG. 2. Therefore, the description thereof is omitted.

Based on the prediction angle $\theta 1$ calculated by the calculation unit 32, the symbol timing estimating unit 33 estimates an applicable sample timing from the sample timings Pm (P1 to P16) on the polar coordinates illustrated in FIG. 4. Because one symbol period of the sample timings Pm corresponds to one round, the angle indicated by the prediction angle $\theta 1$ means a sample timing. In the strict sense, the prediction angle $\theta 1$ at which the correlation value becomes maximum is not applicable to any of the angles obtained by dividing one round into the equal 16 parts. Therefore, the symbol timing estimating unit 33 may estimate any one of the sample timings Pm that corresponds to the closest angle to the prediction angle $\theta 1$.

The symbol timing estimating unit 33 instructs the selector 34 to select, based on the estimated value of the symbol timings Pm estimated by the symbol timing estimating unit 33, the received signal stored in the buffer that corresponds to the applicable sample timing.

For example, in the state illustrated in FIG. 3, FIG. 5, FIG. 6, and FIG. 8, the calculation unit 32 calculates the prediction angle $\theta 1$ as being 45 degrees. Based on 45 degrees given as the calculation result by the calculation unit 32, the symbol timing estimating unit 33 estimates that the correlation value becomes maximum at the sample timing P3. Based on the estimation by the symbol timing estimating unit 33 that the correlation value becomes maximum at the sample timing P3, the selector 34 selects the received signal stored in the third buffer 110-3 and outputs the selected received signal to the synchronization determination correlator 35.

The synchronization determination correlator 35 calculates a correlation value between the synchronization word and the received signal that is stored in the buffer corresponding to the timing P3, which is estimated, by the symbol timing estimating unit 33, to provide the maximum correlation value. The synchronization determination correlator 35 then outputs the calculated correlation value to the frame timing determining unit 36 and the symbol timing determining unit 37.

When the correlation value calculated by the synchronization determination correlator 35 is equal to or more than a certain threshold, the frame timing determining unit 36 determines a frame timing. The frame timing determining unit 36 generates a frame synchronization signal based on the determined frame timing and outputs the frame synchronization signal to the demodulation unit 40.

When the correlation value calculated by the synchronization determination correlator 35 is equal to or more than a certain threshold, the symbol timing determining unit 37 determines a symbol timing in the received signal. The symbol timing determining unit 37 generates a symbol synchronization signal based on the determined symbol timing and outputs the symbol synchronization signal to the demodulation unit 40. The frame timing determining unit 36 and the symbol timing determining unit 37 both not only make the determinations but also generate the respective synchronization signals. Therefore, these two units are collectively referred to as a synchronization signal generating unit 38.

As described earlier, the demodulation unit 40 executes demodulation processing on the received signal based on the timing information, that is, the frame synchronization signal and the symbol synchronization signal, detected by the synchronization timing detector 30.

According to the present embodiment, a symbol timing is estimated by calculating correlation values for four buffers of the 16 buffers and calculating an arctangent for predicting the maximum correlation value. The processing amount for calculating an arctangent, for example, when the calculation is replaced by a Chebyshev approximation formula, is the same as in a case where a correlation value for one buffer is calculated. That is, according to the present embodiment, when the synchronization timing detector includes 16 buffers, a synchronization timing can be detected by the processing whose calculation amount is the same as in the processing for calculating correlation values for 6 buffers.

In contrast, according to the conventional method, when the synchronization timing detector includes 16 buffers, correlation values for all of the 16 buffers needs to be calculated in order to detect a synchronization timing, as described above. That is, the present embodiment enables a detection of a synchronization timing with half or less calculation amount compared with the conventional method.

In the above description, the calculation unit 32 estimates a symbol timing by detecting correlation values for four buffers: the first buffer 110-1, the fifth buffer 110-5, the ninth buffer 110-9, and the thirteenth buffer 110-13. However, in the present disclosure, the calculation unit 32 can estimate a symbol timing by calculating angles through addition of vectors when there are 3 or more buffers.

Figure 9:
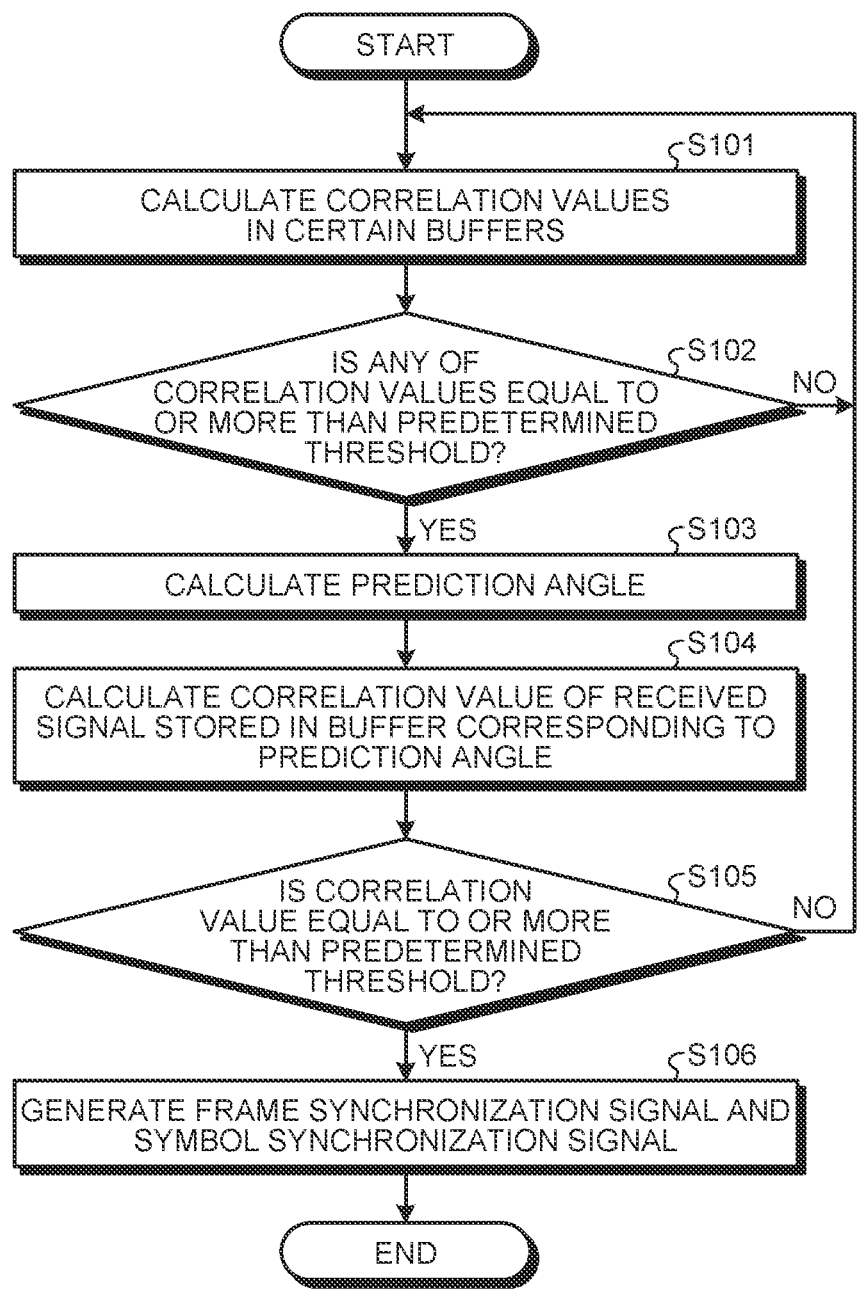
FIG. 9 is a flowchart illustrating an example of a process flow for detecting a synchronization timing according to the present embodiment.

The process flow for detecting a synchronization timing according to the present embodiment will be described with reference to FIG. 9. FIG. 9 is a flowchart illustrating an example of the process flow for detecting a synchronization timing according to the present embodiment.

A certain number of correlators (the first to the nth correlators) each calculate a correlation value between a received signal stored in the corresponding buffer (certain buffer) and a synchronization word (Step S101).

When any of the correlation values calculated at Step S101 is equal to or more than a predetermined threshold (Yes at Step S102), the calculation unit 32 calculates a prediction angle θ1 that corresponds to the maximum correlation value on polar coordinates, based on the correlation values received from the correlators (Step S103).

When all the correlation values calculated at Step S101 are less than the certain threshold (No at Step S102), the flow returns to Step S101, and the calculation unit 32 calculates correlation values for the certain buffers. This is processing for not performing processing at Step S103 and subsequence steps because none of the correlators output large correlation values when a received signal is not a synchronization word.

The symbol timing estimating unit 33 selects the buffer that corresponds to the sample timing that corresponds to the prediction angle θ1 calculated by the calculation unit 32, and the synchronization determination correlator 35 calculates a correlation value between the received signal stored in the selected buffer and the synchronization word (Step S104).

When the correlation value calculated at Step S104 is less than a predetermined threshold (No at Step S105), the flow returns to Step S101.

When the correlation value calculated at Step S104 is equal to or more than the predetermined threshold (Yes at Step S105), the frame timing determining unit 36 determines a frame timing and generates a frame synchronization signal, and the symbol timing determining unit 37 determines a symbol timing and generates a symbol synchronization signal (Step S106). Thereafter, the processing in FIG. 9 ends.

The threshold on correlation values that is used for estimating a sample timing at Step S102 may be lower than the threshold for a correlation value that is used by the synchronization determination correlator for synchronization determination at Step S105. This is because, in the stage of the estimation, the phase of the received signal stored in the buffers corresponding to the thinned-out sample timings (i.e., the starting points for calculating the correlation values) is not necessarily the same as the phase of the synchronization word, and therefore, the correlation values do not tend to be large. In contrast, the synchronization determination correlator receives a received signal stored in the buffer corresponding to a sample timing estimated to provide the maximum correlation value. It is therefore expected that the correlation value will be large, thus the threshold on the correlation value may be set to be large.

As described above, according to the present embodiment, when the receiver side uses a sampling rate that is more than ten times higher, all of the buffers need to be used for calculating correlation values. Thus, the present embodiment suppresses the calculation amount for detecting a synchronization timing to half or less than the calculation amount in the conventional method.

In addition, according to the present embodiment, a correlation value for the buffer predicted to correspond to a synchronization timing can be calculated, and the correlation value thus calculated can be compared with correlation values for the buffers calculated for predicting a synchronization timing. As a result, the present embodiment enhances detection accuracy for a synchronization timing.

According to the present disclosure, the processing load for detecting a symbol synchronization can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A synchronization timing detector comprising:
   n correlators configured to calculate and output correlation values between each of n sample signals and a known synchronization pattern, the n sample signals being extracted from m sample signals that are obtained by oversampling a received signal m times for one symbol period and having sample positions shifted by m/n samples each, where m is a natural number, and n is a natural number that satisfies 3≤n≤m and is a divisor of m;
   a calculation unit configured to generate n correlation value vectors by arranging the correlation values output from the n correlators on polar coordinates at intervals of an angle of 2π(n/m) radians, and add the n correlation value vectors to calculate an angle of a resultant vector of the correlation value vectors; and
   a symbol timing estimating unit configured to estimate a symbol timing of the received signal based on the angle of the resultant vector calculated by the calculation unit.

2. A wireless communication device comprising:
   a detection unit configured to detect a radio frequency signal and convert the radio frequency signal into a received signal;
   a demodulation unit configured to demodulate the received signal; and
   a synchronization timing detector configured to generate a synchronization signal used by the demodulation unit for demodulating the received signal, wherein the synchronization timing detector comprises:
   n correlators configured to calculate and output correlation values, between each of n sample signals and a known synchronization pattern, the n sample signals being extracted from m sample signals that are obtained by oversampling the received signal m times for one symbol period and having sample positions shifted by m/n samples each, where m is a natural number, and n is a natural number that satisfies 3≤n≤m and is a divisor of m;
   a calculation unit configured to generate n correlation value vectors by arranging the correlation values output from the n correlators on polar coordinates at intervals of an angle of 2π(n/m) radians, and add the n correlation value vectors to calculate an angle of a resultant vector of the correlation value vectors;
   a symbol timing estimating unit configured to estimate a symbol timing of the received signal based on the angle of the resultant vector calculated by the calculation unit; and a synchronization signal generating unit configured to generate the synchronization signal based on the estimated symbol timing.

3. A non-transitory computer-readable recording medium containing a computer program, the computer program causing a computer to execute:

calculating and outputting n correlation values between each of n sample signals and a known synchronization pattern, the n sample signals being extracted from m sample signals that are obtained by oversampling a received signal m times for one symbol period and having sample positions shifted by m/n samples each, where m is a natural number, and n is a natural number that satisfies $3 \leq n \leq m$ and is a divisor of m;

generating n correlation value vectors by arranging the n correlation values on polar coordinates at intervals of an angle of $2\pi(n/m)$ radians, and adding the n correlation value vectors to calculate an angle of a resultant vector of the n correlation value vectors; and estimating a symbol timing of the received signal based on the angle of the resultant vector.

\* \* \* \* \*